Feb. 21, 1928.
J. P. HEIL ET AL
1,659,872
HAND HOIST FOR TRUCKS
Filed April 23, 1923
2 Sheets-Sheet 1
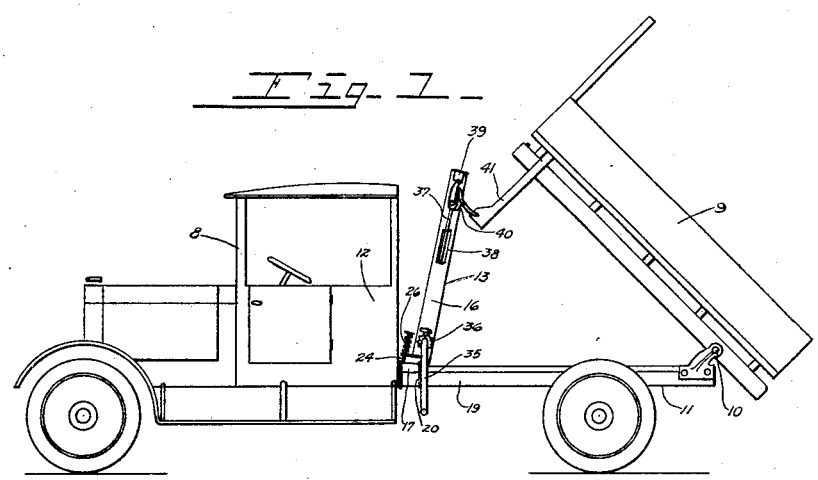

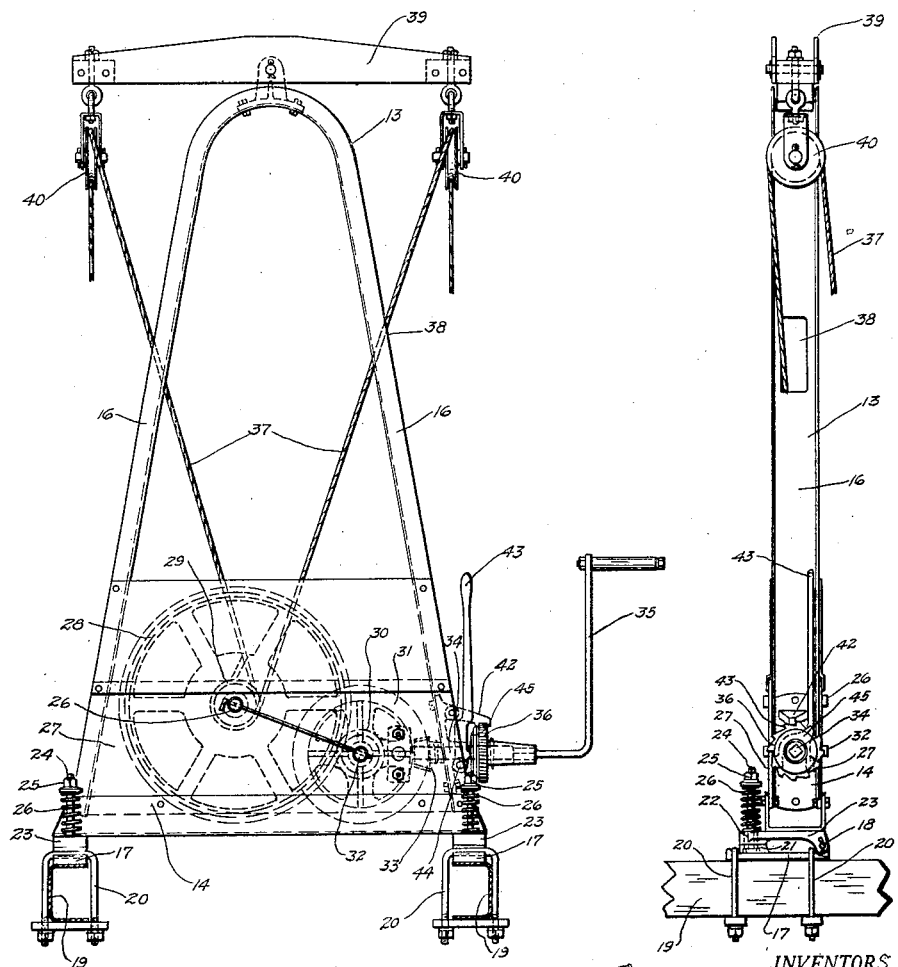

Patented Feb. 21, 1928.

1,659,872

UNITED STATES PATENT OFFICE.

JULIUS P. HEIL AND ARTHUR BORCHARDT, OF MILWAUKEE, WISCONSIN.

HAND HOIST FOR TRUCKS.

Application filed April 23, 1923. Serial No. 633,937.

This invention relates to improvements in dump trucks and more particularly to a hand hoist for light trucks.

It is one of the objects of the present invention to provide a manually operated hoist whereby a truck body may be moved to an inclined position to facilitate the unloading of material therefrom.

A further object of the invention is to provide a hoist of the class described having pivotally mounted standards so constructed that they will incline toward the truck body as the truck body is raised and in that manner, the standards will be relieved of lateral strain.

A further object of the invention is to provide a hoist having manually operated means for retarding or checking the downward movement of the truck body.

A further object of the invention is to provide a hoist of the class described having members pivotally mounted on the hoist standards for equalizing the tension or strain on the cables employed.

A further object of the invention is to provide a hoist for truck bodies which will occupy a small amount of space on the truck.

A further object of the invention is to provide a truck hoist in which the parts may be locked to hold the truck body at any inclined position.

A further object of the invention is to provide a truck hoist which is of very simple construction, is strong and durable, and is well adapted for the purpose described.

With the above and other objects in view, the invention consists of the improved truck hoist, its parts and combinations as set forth in the claim, and all equivalents thereof.

Referring now more particularly to the accompanying drawings, in which the same reference characters indicate the same parts in all of the views:

Fig. 1 is a side view of a dump truck provided with the improved hand hoist;

Fig. 2 is a rear view of the hoist standards and other mechanism to elevate a truck body, on a larger scale; and Fig. 3 is a side edge view thereof.

Referring to the drawings, the numeral 8 indicates a truck having a body portion 9 pivotally mounted, as at 10, on the end portion of the truck chassis 11. The inner end of the truck body terminates a short distance from the vehicle seat 12 and between the seat and the inner end of the body, the hoisting mechanism is interposed. The numeral 13 indicates a standard member which has the shape of an inverted U with a transverse beam 14 connecting the arms 16. The lower ends of the arms 16 are pivotally connected to plates 17, as at 18, and said plates, in turn, are secured to the side beams 19 of the truck chassis by means of U-bolts 20. The ends of said plates opposite the pivotally connected ends have upstanding portions provided with enlarged apertures 21 which register with similarly sized apertures 22 formed in connecting plates 23 which are carried by the extremities of the standard arms 16. Upstanding bolts 24 of somewhat smaller diameter than the apertures 21 and 22 are rockingly carried by plates 17 and project through the apertures of both sets of plates, and said bolts have coiled springs 26 thereabout interposed between the upper faces of plates 23 and nuts 25 threaded on said bolts. This bolt connection, together with the pivotal connection of the standard member, will be more fully explained hereinafter.

A shaft 26 is fixedly mounted in a pair of plates 27 which are secured to opposite front and rear sides of the arms of said standard, and said shaft revolubly carries a large gear 28 which has secured thereto a drum 29 adapted to revolve with said gear. Said large gear meshes with a small pinion 30 formed integral with a larger bevel gear 31 which is revolubly mounted on a fixed shaft 32. The bevel gear 31 is revolved by engagement with a bevel pinion 33 fixedly mounted on a shaft 34 which is journaled in the standard and extends at right angles with respect to shaft 32, said shaft 34 being revoluble and having its outer end provided with a crank 35 for manually revolving it. Said shaft 34 also has fixedly mounted thereon, adjacent the outer edge of the standard, a ratchet wheel 36.

It is apparent that the gears and pinions are so arranged that a revolving movement given to shaft 34 by the crank 35 will be transmitted to the large gear 28 and to the drum 29 carried thereby. For the purpose of lifting the truck body 9 when said drum is rotated in a certain direction, a pair of cables 37 have their inner extremities secured to said drum and are adapted to be wound thereabout. After leaving the drum, said cables diverge outwardly and upwardly and pass through opposite elongated slots 38 formed in the arms 16 medially of their length. The top portion of the standard member 13 pivotally carries a lever member 39 which serves as a cable tension equalizing member and has pulleys 40 suspended from each end portion. Over said pulleys, the cables 37 are hung and their outer ends are fastened to downwardly projecting arms 41 formed on the outer sides of the inner end of the truck body, as shown in Fig. 1.

The operation of the improved truck hoist is very simple. If it is desired to raise or incline the truck body, the crank 35 is turned so as to wind the cables on the drum 29 which is in geared connection with said crank. As the shaft 34 is revolved by the crank, a pivotally mounted dog 42 carried by the standard, will ride over the ratchet wheel 36 and engage the perpendicular portions of the ratchet wheel teeth 43 to prevent backward rotation of the gears and drum caused by the weight of the truck body. Thus, when the desired inclination of the truck body has been attained, it will be held in that position. Also, while the truck body is being inclined, the pull of the cables will force the standard member 13 from its normal upright position to a slanting position. This tilting movement of the standard is accomplished by means of the pivotal connection 18 mentioned heretofore and the rocking engagement of the bolts 24 with the ends of the standard, the springs 26 being compressed when the tilting movement occurs. In the above described manner, the standard is relieved from lateral strain while the truck body is being inclined.

To lower the body, it is merely necessary to swing the dog 42 upwardly so as to disengage the ratchet wheel and gravity will move the body to its normal horizontal position. However, it is desirable to regulate the downward movement of the truck body so the same will not jar and to relieve the parts from sudden strain. For that purpose, a brake lever 43 is pivotally connected to the standard, as at 44, close to the inner face of the ratchet wheel 36. Positioned between the brake lever and ratchet wheel, longitudinally movable on the shaft 34, is a friction plate 45. Thus, when the brake lever is pulled outwardly, it will force the friction plate into bearing contact with the inner face of the ratchet wheel, thereby checking the rotation of the shaft 34 and all parts having motion transmitted therefrom. It should also be noticed that while the truck body is moving from an inclined position to its normal horizontal position, the springs 26 will expand and force the standard member to its normal upright position.

From the foregoing description, it will be seen that the improved hand hoist for dump trucks is of very simple construction, and is well adapted for the purpose described.

What we claim as our invention is:

In a dumping vehicle having a pivotally mounted body, a standard hoisting mechanism associated with the body, a plate having an upstanding portion provided with an enlarged aperture secured to each side of the vehicle frame, a plate also having an upstanding portion and an enlarged aperture, pivoted at one end to the first mentioned plate, secured to each extremity of the standard, a bolt of smaller diameter than the apertures in the plates projecting through the apertures of each set of plates, a nut threaded on the end of each of said bolts, and a coiled spring interposed between the upper faces of the standard plates and the nuts.

In testimony whereof, we affix our signatures.

JULIUS P. HEIL.
ARTHUR BORCHARDT.